(12) United States Patent
Swails et al.

(10) Patent No.: US 8,479,775 B2
(45) Date of Patent: Jul. 9, 2013

(54) PUSH-ON HOSE CONSTRUCTION

(75) Inventors: Michael R. Swails, Madison, OH (US); William C. Fisher, Cuyahoga Falls, OH (US); Albert S. Balko, Garrettsville, OH (US); Ronald W. Duescher, Whitelaw, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 2599 days.

(21) Appl. No.: 10/931,907

(22) Filed: Sep. 1, 2004

(65) Prior Publication Data
US 2005/0199308 A1 Sep. 15, 2005

Related U.S. Application Data (60) Provisional application No. 60/552,348, filed on Mar. 11, 2004.

(51) Int. Cl.
*F16L 11/00* (2006.01)

(52) U.S. Cl.
USPC ............ 138/109; 138/124; 138/125; 285/239

(58) Field of Classification Search
USPC ................... 138/125, 123, 124, 109; 285/239
See application file for complete search history.

(56) References Cited

U.S. PATENT DOCUMENTS

| | | | |
|---|---|---|---|
| 1,996,855 A | 4/1935 | Cheswright | 285/239 |
| 2,066,473 A | 1/1937 | Jorgensen | 285/237 |
| 2,805,088 A | 9/1957 | Cline et al. | 285/239 |
| 2,854,030 A | 9/1958 | Schulthess | 285/239 |
| 2,864,378 A | 12/1958 | Schneller et al. | 285/114 |
| 3,116,760 A | 1/1964 | Matthews | 138/125 |
| 3,154,329 A | 10/1964 | Skinner | 285/239 |
| 3,159,183 A | 12/1964 | Brumbach | 138/125 |
| 3,210,100 A | 10/1965 | Lowles et al. | 285/239 |
| 3,251,381 A | 5/1966 | Koch | 138/125 |
| 3,266,527 A | 8/1966 | Ross | 138/125 |
| 3,332,447 A | 7/1967 | Holmgren | 138/125 |
| 3,467,764 A | 9/1969 | Knapp | 174/74 R |
| 3,613,736 A | 10/1971 | Kuwabara | 285/239 |
| 3,711,130 A | 1/1973 | Betzler | 285/239 |
| 3,759,445 A | 9/1973 | King | 239/201 |

(Continued)

FOREIGN PATENT DOCUMENTS

| | | |
|---|---|---|
| DE | 1 223 209 | 8/1966 |
| DE | 41 26 499 A1 | 2/1993 |
| GB | 438250 | 11/1935 |
| GB | 737216 | 9/1955 |

OTHER PUBLICATIONS

Parker Hannifin Corporation Bulletin 4460-B3 dated Oct. 1974 for Type PV 82 Hose.

(Continued)

*Primary Examiner* — Patrick F Brinson
(74) *Attorney, Agent, or Firm* — John A. Molnar, Jr.

(57) ABSTRACT

Push-on hose construction for a self-gripping connection with a barbed nipple or other push in fitting end. The hose has an innermost core tube which exhibits a reduced coefficient of friction for easier insertion of the fitting end. Such core tube may be extruded or otherwise formed of thermoplastic polyurethane or other resin which is dulled or otherwise incompatibilized by the addition of an immiscible such as nonpolar polyolefin homopolymer, copolymer, or mixture thereof.

20 Claims, 3 Drawing Sheets

U.S. PATENT DOCUMENTS

| | | | | |
|---|---|---|---|---|
| 3,953,270 A | | 4/1976 | Ford | 156/80 |
| 3,966,238 A | | 6/1976 | Washkewicz et al. | 285/239 |
| 4,059,847 A | | 11/1977 | Phillips et al. | 361/215 |
| 4,273,160 A | | 6/1981 | Lowles | 138/124 |
| 4,384,595 A | | 5/1983 | Washkewicz et al. | 138/127 |
| 4,431,031 A | * | 2/1984 | Ettlinger | 138/109 |
| 4,585,035 A | | 4/1986 | Piccoli | 138/127 |
| 4,699,178 A | | 10/1987 | Washkewicz et al. | 138/125 |
| 4,952,262 A | | 8/1990 | Washkewicz et al. | 156/149 |
| 6,354,331 B1 | | 3/2002 | Fisher et al. | 138/104 |
| 6,390,141 B1 | * | 5/2002 | Fisher et al. | 138/137 |
| 6,796,547 B1 | * | 9/2004 | Washburn | 254/134.3 FT |
| 2002/0100516 A1 | | 8/2002 | Powell et al. | 138/125 |

OTHER PUBLICATIONS

Parker Hannifin Corporation Bulletin 4482-B1, Revised Oct. 1970 for Push-Lok low pressure hose and fittings.

Parker Hannifin Corporation Fluid Connectors Bulletin 4481-B1, Apr. 1997 for Push-Luk® low-pressure hose and fittings.

* cited by examiner

PUSH-ON HOSE CONSTRUCTION

CROSS-REFERENCE TO RELATED CASES

The present application claims the benefit of the filing date of U.S. Provisional Application Ser. No. 60/552,348; filed Mar. 11, 2004, the disclosure of which is expressly incorporated herein by reference.

BACKGROUND OF THE INVENTION

The present invention relates broadly to a flexible reinforced hose construction of a push-on variety for use in conjunction with a fitting end configured as an insertable, barbed nipple, and more particularly to such a hose construction having a polyurethane or other thermoplastic inner core tube element which exhibits a reduced coefficient of friction.

Flexible "push-on" tubing and hose, which for purposes of convenience is referred to herein simply as "hose," is used in a variety of fluid transfer applications for conveying fluid pressures which typically are in the range of from about 60 psi (0.5 MPa) to 500 psi (3.5 MPa) or more. Representative applications include use as shop air lines, and as industrial or automotive water, gasoline, oil, and antifreeze lines. By "push-on," it is meant that one or both of the terminal ends of the hose may be frictionally sleeved over an associated fitting or other connector adapted as having a distal or free end configured as a barbed nipple. That is, the nipple end of the fitting is insertable into the hose which is "self-gripping" such that the inner diameter of the hose is resiliently expanded and recovered to develop radially compressive forces retaining the nipple within the hose in a fluid-tight engagement. Advantageously, the described hose and fitting arrangement may be used to without auxiliary ferrules, wires, shells, crimps, or clamps, and thereby provides for a rapid, easily replaceable assembly at a relatively low cost.

In basic structure, hoses of the "push-on" type herein involved typically are constructed as having a tubular, innermost core surrounded by one or more outer layers of a fiber reinforcement. The reinforcement, in turn, is protected by a surrounding outermost sheath or cover which may be of the same or different material as the core tube. The cover also provides the hose with increased abrasion resistance.

The core tube, which may be a thermoplastic material such as a polyamide, polyolefin, polyvinyl chloride, or polyurethane, or a synthetic rubber material such as Buna N or neoprene, may be conventionally extruded and cooled or cured. As is detailed in U.S. Pat. Nos. 3,116,760; 3,159,183; 3,966,238; 4,952,262, the tube may be cross-headed extruded on a mandrel for support, or otherwise supported in later forming operations using air pressure and/or reduced processing temperatures. From the extruder, the tube may be collected on a reel or other take-up device for further processing. As dispensed from the reel or, in a continuous in-line process, taken directly from the extruder, the tube, which may be frozen or otherwise chilled, such as by being sprayed with a liquid and gaseous nitrogen mixture or the like to improve dimensional stability, next may be passed through an applicator for its coating with an outer layer of an adhesive material which may be a polyurethane or other isocyanate-based adhesive. The adhesive-coated core tube then may be delivered through one or more braiders or winders which may be used to surround the tube with one or more reinforcement layers of a fibrous material such as a monofilament, yarn, or wire. The reinforcement layers, which may be applied under tension and bonded to the core tube via the adhesive layer, typically may be formed of an interwoven braid or a spiral winding of a nylon, polyester, or aramid yarn, or a metal wire.

Following the application of the reinforcement layer, a second adhesive layer may be applied to bond the reinforcement to the outer cover or sheath. Such cover, which may be applied as a cross-head extrusion or a spiral-wound wrapping, typically is formed of abrasion-resistance polymeric material such as a polyamide, polyolefin, polyvinyl chloride, or polyurethane. Again, the adhesive layer bonds the outer cover to the reinforcement layer.

A representative push-on hose construction is described in commonly assigned U.S. Pat. No. 3,966,238. Such constriction involves a core tube formed of a synthetic rubber or plasticized polyvinyl chloride, a braided non-metallic fibrous reinforcement, and an outer cover of a synthetic rubber or plasticized polyvinyl chloride. Another representative push-on hose construction is described in U.S. Pat. No. 3,210,100 as adapted for use with a tubular hose nipple having a plurality of annular barbs. Hoses of these types are manufactured and sold commercially by Parker-Hannifin Corp. of Cleveland, Ohio, under the trademark PUSH-LOK®.

Other composite hose constructions and methods for constructing the same are described in commonly-assigned U.S. Pat. Nos. 4,952,262; 4,699,178; 4,384,595; and 4,273,160, in U.S. Pat. Nos. 3,711,130; 3,332,447; 3,266,527; 3,251,381; 3,159,183; 3,116,760; 2,805,088, and in British patent No. 737,216. Barbed hose nipples, connectors, and couplings are described in U.S. Pat. Nos. 3,154,329 and 1,996,855; in British Patent Nos. 878,599 and 438,250, and in German Auslegeschrift No. 1,223,209.

Other push-on type hoses and fittings therefor are described in U.S. Pat. Nos. 3,711,130 and 2,805,088, with other flexible reinforced hose constructions being shown in commonly-assigned U.S. Pat. Nos. 4,952,262; 4,699,178; 4,384,595; and 4,273,160, in U.S. Pat. Nos. 3,332,447; 3,266,527; 3,251,381; 3,159,183; 3,116,760; and 2,854,030, and in British Patent No. 737,216. Barbed hose nipple fittings are described in U.S. Pat. Nos. 3,759,445; 3,154,329; and 1,996,855, in British Patent Nos. 878,599 and 438,250, and in German Auslegeschrift No. 1,223,209.

In view of the foregoing, it will be appreciated that the core tube of a push-on hose construction must exhibit a demanding balance of mechanical and other physical properties for the proper performance of the ultimate fitting assembly. Indeed, the hose must be able to be pushed onto the fitting over the barbs of the nipple end without excessive force as this operation often is performed manually. Once assembled, however, the joint must be able to withstand repeated cycles of pressure pulses, without leakage or the blowoff of the hose from the fitting, at service temperature extremes of −40° F. (−40° C.) to 200° F. (93° C.). Accordingly, core tubes heretofore have been constructed of a synthetic rubber material, such as Buna N or neoprene, or from a thermoplastic elastomeric material such as polyvinyl chloride having a relatively high coefficient of friction.

However, as commercial applications for push-on hoses have increased, there have been calls from industry further improvements in such hoses and in the materials of construction therefor. Especially desired would be a construction which facilities hand assembly by reducing the force typically required to insert the fitting into the hose, but which also is able to withstand repeated pressure cyclings without leakage or blowoff.

BROAD STATEMENT OF THE INVENTION

The present invention is directed to an push-on hose construction which is manually insertably connectable with a barbed nipple or like fitting. In being provided as having an inner core tube with a relatively low coefficient of friction, the push-on force needed for the insertion of the barbed end of the nipple into a terminal end of the fitting is reduced. Accordingly, a manual, self-gripping connection of the hose to the nipple is more easily established, but without any appreciable loss in the fluid integrity or other physical performance of the connection.

In an illustrated embodiment, the core tube is extruded from an incompatibilized, elastomeric thermoplastic composition such as a thermoplastic polyurethane elastomer (TPU). As is described in German Unexamined Patent Application DE 41 26 499 A1, filed Aug. 10, 1991, such TPU's are formulated by the addition of a nonpolar polyolefin agent to a polyurethane component. As the polyolefin is not compatible or miscible with the polyurethane component, a phase separation is effected which, in turn, produces a stain-like surface finish in the extruded composition.

The use of these incompatibilized or "dulled" TPU's heretofore had been proposed for cable and sheet production to prevent sticking and to reduce surface glare as compared to conventional TPU's having a microscopically smooth surface. With respect to cable applications, outer sheathings or jackets formed from these Thus were observed to minimize sticking during winding and unwinding operations, and blocking as the cable wire is pulled into its jacket or the cable itself is pulled through a conduit. As is detailed herein, however, it has been discovered that these same TPU's may be used in the inner core tube of a push-on hose constructions notwithstanding that such tube must not only receive the insertion of the barbed end of the fitting, but also must frictionally retain the fitting end under repeated fluid pressure cyclings and/or impulses. The present invention contemplates the use of these dulled or incompatibilized TPU's in a new application.

Advantages of the present invention include a push-on hose construction which allows for manual, self-gripping connection of the hose to the nipple at a reduced push-on force, but without appreciably affecting the integrity of the connection. Additional advantages include a push-on hose construction which facilities hand assembly without need to use water, soap, or other lubrication. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the purposes of the discourse to follow, the precepts of the invention herein involved are described in connection with its utilization as a core tube within a representative push-on hose construction adapted particularly for use in low working pressure, i.e., up to about 500 psi (3.5 MPa), mobile or industrial pneumatic, fluid transport, control, or other applications. It will be appreciated, however, that aspects of the present invention may find use in other hose and tubing constructions for a variety of applications. Use within those such other applications therefore should be considered to be expressly within the scope of the present invention.

Figure 1:
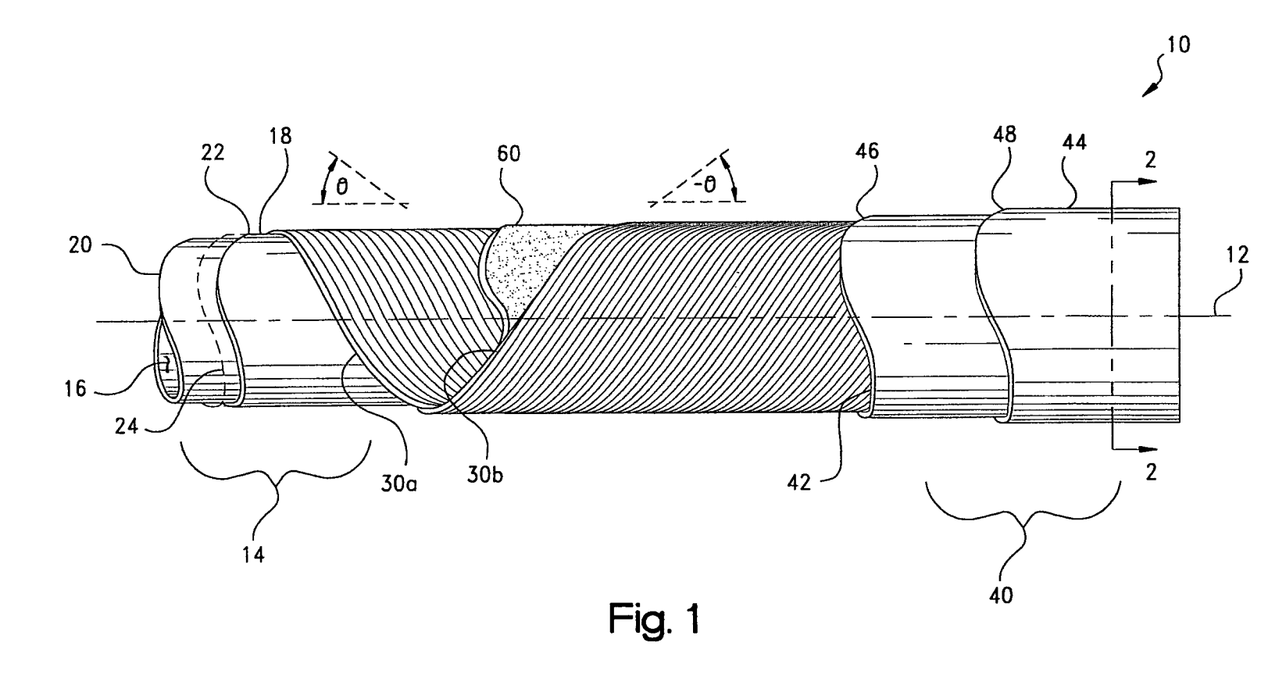
FIG. 1 is a side elevation, cut-away view of a representative push-on hose construction according to the present invention.
Figure 2:
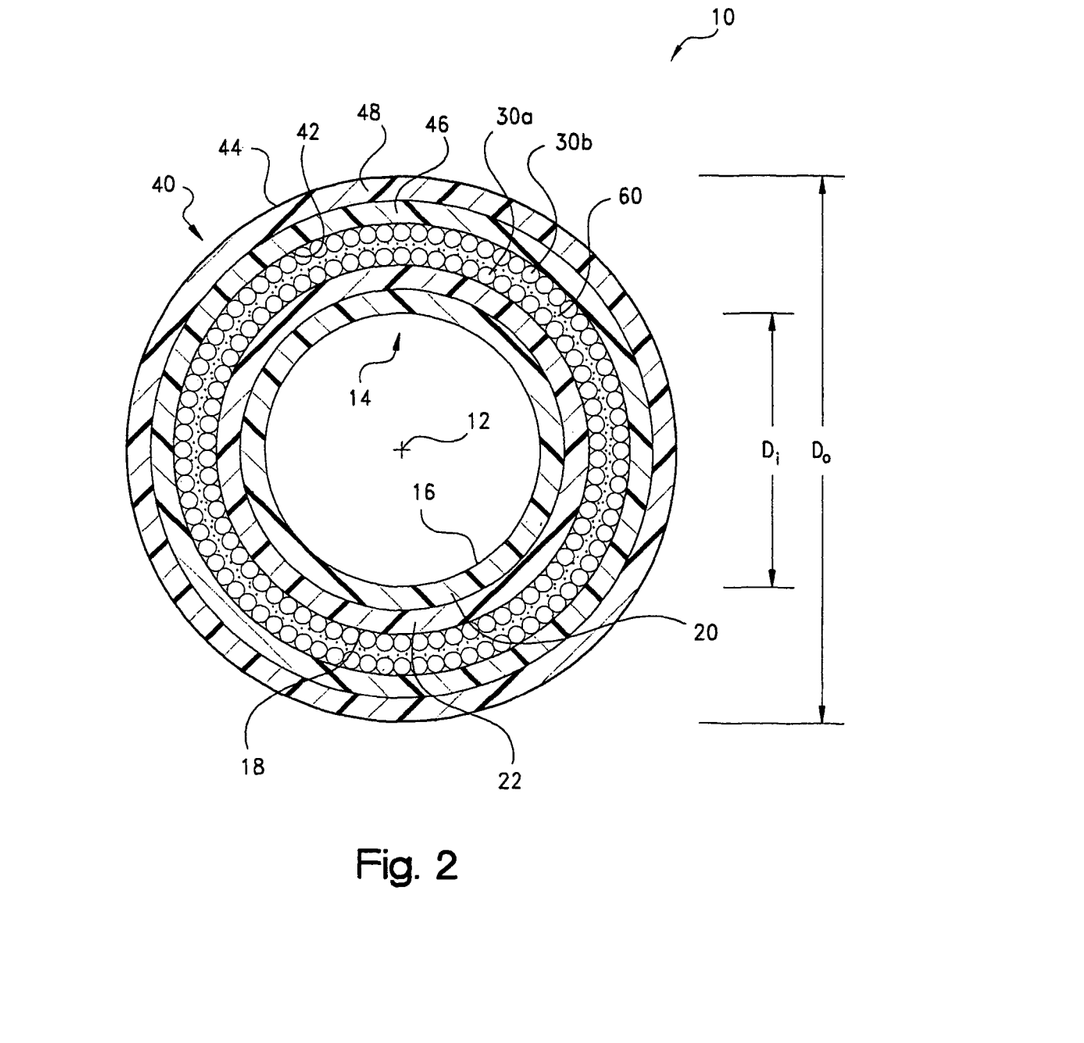
FIG. 2 is a radial cross-sectional view of the hose of FIG. 1 taken through line 2-2 of FIG. 1.

Referring then to the figures wherein corresponding reference numbers are used to designate corresponding elements throughout the several views, a representative hose construction according to the present invention is shown generally at 10 in the cut-away view of FIG. 1 and in the radial cross-sectional view of FIG. 2. In basic dimensions, hose 10 extends axially to an indefinite length along a central longitudinal axis, 12, and has a select inner and outer diameter referenced, respectively, at "$D_i$" and "$D_o$" in the radial cross-sectional view of FIG. 2. The inner and outer diameter dimensions may vary depending upon the particular fluid conveying application involved, but generally will be between about 3/32-2 inch (0.24-5 cm) for inner diameter $D_i$, and about 0.30-2.8 inch 0.76-7.1 cm) for outer diameter $D_o$, with a overall wall thickness, "w," therebetween of between about 0.26-0.40 inch (0.66-1.0 cm).

As may be seen in the different views of FIGS. 1 and 2, hose 10 is constructed as being formed about a tubular innermost member or core, referenced at 14. In accordance with the precepts of the present invention, core tube 14 may be provided as extruded from a thermoplastic material, and, particularly, a thermoplastic elastomer such as a silicone, fluorosilicone, thermoplastic rubber, or, preferably, a thermoplastic polyurethane elastomer (TPU), which may be selected specifically for chemical compatibility with the fluid being handled. Although a TPU may be considered preferred, other thermoplastics which exhibit rubber-like properties, such as plasticized polyamides, e.g., nylons, polyolefins, fluoropolymers, polyesters, ethylene vinyl acetates, and polyvinyl chlorides, may be suitable. Core tube 14 has a circumferential inner core tube surface, 16, defining the inner diameter $D_i$ of the hose 10, and a circumferential outer core tube surface, 18. As with the overall dimensions of hose 10, the wall thickness of core tube 14 may vary for the particular application envisioned, but typically will be between about 0.02-0.08 inch (0.5-2 mm).

Although core tube 14 typically may be formed of a unitary, single-layer construction, it may be preferred for some applications that the core tube 14 be provided, as shown, as having a composite, multi-layer construction. In such multi-layer construction, core tube 14 includes an innermost layer, 20, which defines the inner core tube surface 16, an outermost layer, 22, which defines the outer core tube surface 18, and, optionally, one or more intermediate layers (not shown). With the innermost layer 20 being formed, for example, of an incompatibilized TPU in the manner detailed below, the outermost layer 22 and/or one or more or the intermediate layers may be formed of a standard TPU or of another thermoplastic or other resin such as polyvinyl chloride (PVC), a polyolefin such as polyethylene or polypropylene, or a nylon or other polyamide, or, alternatively, of a vulcanizable, i.e., thermosetting, or melt-processible, i.e., thermoplastic, natural or synthetic rubber such as a chlorosulfonate polyethylene or other polyolefin, polybutadiene, butyl, neoprene (polychloroprene), nitrile, polyisoprene, buna-N, copolymer rubber such as ethylene-propylene (EPR), styrene-isoprene-styrene (SIS), styrene-butadiene-styrene (SBS), ethylene-propylene-diene monomer (EPDM), nitrile-butadiene (NBR) and styrene-butadiene (SBR), or a blend such as ethylene-propylene rubber, ethylene or propylene-EPDM, EPR, or NBR, and copolymers and blends or other mixtures or combinations of any of the foregoing. Particularly, the material of the outermost layer 22 may be selected for enhanced chemical resistance or other chemical, physical, or electrical property such as low flexural modulus or static dissipation, or for reasons of cost, or otherwise.

Preferably, outermost layer 22 is formed of a material which is compatible with or otherwise bondable directly to the innermost layer 20. Alternatively the two layers may be bonded, if incompatible, by means of an adhesive, solvent, or other agent such as a surface activator, or by means of a tie layer in a manner to be described hereinafter. For strength and flexibility considerations, the wall thickness of outermost layer 22 may be thicker than that of innermost layer 20, and typically will range from about 20 mils (0.5 mm) to about 60 mils (1.5 mm).

Core tube 14 may be fabricated, for example, by molding or extrusion, or in the case of layers 20 and 22, by co-extrusion, or sequential extrusion and, in the case of layers 20 and 22, if formed of compatible materials, cross-linked or otherwise chemically or fusion bonded together at their interface into an integral, tubular composite structure. If formed of chemically dissimilar or otherwise incompatible materials, however, an intermediate tie or bonding layer, shown in phantom at 24 in FIG. 1, may be co-extruded, i.e., "tri-extruded," with layers 20 and 22 as being formed of a material which is adhesion bond compatible with both the materials of layers 20 and 22. Preferably, intermediate layer 24 is formed of material which also is resistant to solvent permeation, and which generally is more elastic than the material forming layer 20. Suitable materials include PVDF, PVF, polyvinyl acetate (PVA), urethanes, and copolymers, alloys, and blends thereof, as well as thermoplastic or thermosetting rubbers. The wall thickness of intermediate layer typically will be less than or about equal to the wall thickness of inner layer 20. Composite tubes of the type herein involved are further described in U.S. Pat. Nos. 3,561,493; 5,076,329; 5,167,259; 5,284,184; 5,383,087; 5,419,374; 5,460,771; 5,469,892; 5,500,257; 5,554,425; 5,566,720; 5,622,210; 5,678,611; and 5,743,304, and are marketed commercially by ITT Automotive, Inc. (Auburn Hills, Mich.) and by Pilot Industries, Inc. (Dexter, Mich.).

Suitable TPU's for forming core tube 14 and/or innermost layer 20 include polyester or polyester polyol-based monomers, oligomers, and prepolymers, as well as those based on hydroxyl-terminated polycarbonates, polycaprolactams, polyolefins, polyacrylates, or on combinations thereof. The urethane linkage of the TPU itself may be based on a reaction between the polyol and a diisocyante, such as a monomer, oligomer, or prepolymer, which may be diphenylmethane diisocyanate (MDI), tolidine diisocyanate (TDI or TODI), or p-phenylenediisocyanate (PPDI), or a combination thereof. One or more of water or an aliphatic or aromatic diol, diamine, glycol, ether, alcohol, or phenol, or other low molecular component, i.e., having a relatively low average molecular weight in the range of between about 40 and 500, also may be include in the reaction as a chain extender such as for the purpose of controlling the crystallinity and, accordingly, the hardness of the resulting polymer.

Additives such as pigments, fillers, lubricants, stabilizers, antioxidants, coloring agents, fire retardants, and the like are commonly used in TPU formulations, and optionally may be incorporated into the composition. In addition, the components may be reacted in the presence of a catalyst to speed the reaction profile. Suitable catalysts which promote the reaction between the NCO groups of the diisocyanate and the hydroxyl groups of the diol and chain extenders include tertiary amines and organometallic compounds such as dibutyl tin dilaurate or stannous octoate. Such catalysts typically are provided in the formulation at about 0.005 to 0.1 parts by weight.

In accordance with the precepts of the present invention, the core tube is extruded from a TPU or other thermoplastic elastomer or other resin which has been "incompatibilized," such as via the addition of an immiscible agent, so as to effect a "dulled," i.e., stain-like, surface finish. In the case of a TPU, for example, or such other resin having hydroxyl or other polar groups, a nonpolar or essentially nonpolar polyolefin component may be admixed with the TPU or other like resin component as the dulling agent therefor. As such polyolefin component is not compatible, i.e., miscible with the TPU or other like resin component, a phase separation, such as preferentially concentrated domains of the agent dispersed in an essentially continuous phase of the resin (or vice versa depending upon the relative concentrations of the agent and resins), may be effected as between such components. Such separation, in turn, may effect a stain-like surface finish in a core tube 14 which is extruded, molded, or otherwise formed therefrom. Conversely, in the case of a non-polar resin such as a polyolefin, a polar resin, such as a polyurethane, may be employed as the dulling agent.

A core tube 14 formed in accordance with the precepts of the invention as comprising an admixture of a TPU having a shore durometer of between about 60 A-98 A and up to about 10% by weight of an essentially nonpolar polyolefin or other dulling agent typically may have an inner core tube surface 16 which exhibits a coefficient of static friction (COF) of between about 0.6 and 1.0, and a kinetic COF of between about 0.5 and 0.8. Such COF's represent about a 500% reduction in static COF and about a 325% or more reduction in kinetic COF as compared to the TPU alone. Such reduction in COF facilitates the insertion of the fitting into the hose by reducing the push-on force required to insert the fitting into the hose tube, while the unaffected mechanical gripping action effected between the fitting barbs and the recovered core tube allows the fitting to be retained in the hose without an appreciable effect on pull out force.

More particularly, and as is further described in German Unexamined Patent Application DE 41 26 499 A1, filed Aug. 10, 1991, the polyolefin component which may be employed as the dulling agent for the TPU component may be formulated as a nonpolar or essentially nonpolar polyolefin homopolymer or copolymer, which may be one or more of polybutylene, polypropylene, polyethylene, and polystyrene such as an impact modified copolymer of styrene-butadiene, or ethylene-propylene-diene rubbers, or a blend or other mixture or combination of such homopolymers or copolymers, or of one or more such homopolymers and one or more such copolymers. Typically, the polyolefin component or other agent, which may have a molecular weight, by weight or number average, of between about 1,000-3,000,000, is blended or otherwise admixed with the TPU or other resin component at a concentration of up to about 25% by weight by total weight of the admixture, and preferably between about 5-15% by weight, although the admixture may contain up to about 75% or more by weight of the polyolefin component.

The resin and agent components may be admixed by the addition of the agent to at least one or the reaction components, e.g., polyol or isocyanate, from which the TPU or other resin may be polymerized. Alternatively, and more typically, the agent is admixed with the finished resin such as in the form of pellets, powder, or granules which is dry blended or otherwise admixed with the resin, which also may be in the form of pellets, powdered, or granules. Such pellets, powder, or granules of the agent component themselves may comprise a concentrated, i.e., 70% or more by weight, admixture of the agent and a resin which may be the same or different resin as the resin component. The dry bleeding or other admixing may be effected via the charging of a hopper, tank, or other vessel or feeder of an extruder or other processing equipment with the agent and resin. In the case of extrusion processing, the agent and resin thereby may be admixed in a molten state within the extruder barrel such as at a temperature of between about 160-225° C.

Returning to FIGS. 1 and 2, with respect to the spiral-wound construction shown in FIGS. 1 and 2, at least two reinforcement layers, 30a-b, may be provided over the core tube 14. Each of the reinforcement layers 30 may be conventionally formed as braided, knitted, or, as is shown, spiral, i.e., helically, wound of, for example, from 1 to about 40 ends of monofilament, continuous multi-filament, i.e., yarn, thread, tape, or ply, or short "staple" strands of a natural or synthetic fiber material. The fiber material, which may be the same or different in layers 30a-b, may be a nylon, cotton, polyester, aramid, polyvinyl acetate (PVA), or polyphenylene bezobisoxazole (PBO), or a blend or other mixture of combination thereof. In a braided construction (not shown), which also may contain additional spiral wound and/or knitted layers, each of the reinforcement layers may be braided under tension at a pitch angle of between about 40-60° using from between 8-96 carriers each having from 1 to about 24 ends of a 720-6000 denier (800-6600 decitex), multi-filament aramid, polyester, or nylon yarn.

In the illustrated spiral wound construction 10 of FIGS. 1 and 2, which also may contain additional braided and/or knitted layers, the reinforcement layers 30 are oppositely wound in pairs so as to counterbalance torsional twisting effects. For each of the spiral wound layers 30a-b, from 1 to about 40 parallel ends of, preferably, a 720-6000 denier (800-6600 decitex), multi-filament aramid, polyester, or nylon yarn may be helically wound under tension in one direction, i.e., either left or right hand, with the next immediately succeeding layer 30 being wound in the opposite direction. The layers 30a-b may be wound as is shown in FIG. 1 directly over the outer surface 18 of core 14, or, alternatively, over one or more intervening reinforcement layers, as having a predetermined pitched angle, referenced at θ in FIG. 1 for layer 30a and at −θ for layer 30b, measured relative to the longitudinal axis 12 of the hose 10. The layers further may be wound with the yarn or other end having a clockwise or counterclockwise twist of between 0 and about 200 turns per meter which may be imparted as supplied by the manufacturer, i.e., manufacturer's twist, or as is imparted as the ends are spooled. As is known in the art, the twist may be varied to optimize for example, the flexural fatigue resistance of the hose or to minimize the hose diameter or cost.

For typical applications, the pitch angle θ will be selected to be between about 40-60°, but particularly may be selected depending upon the desired convergence of strength, elongation, and volumetric expansion characteristics of hose 10. In general, higher pitch angles result in decreased radial expansion of the hose under pressure, but in increased axial elongation. For higher pressure applications, a "neutral" pitch angle of about 52° generally is preferred as minimizing elongation to about 3% of the original hose length. Alternatively, a pitch angle slightly greater than neutral may be employed to develop a radially-inwardly directed force component for more efficient load transfer. Each of the layers 30 may be wound at the same or different absolute pitch angle, and it is known that the pitch angles of respective reinforcement layers may be varied to affect the physical properties of the hose. In a preferred construction, however, the pitch angles of reinforcement layers 30a-b are provided to about the same, but as reversed in successive layers.

The tension and coverage at which the reinforcement layers 30 are braided or wound may be varied to achieve the desired flexibility, which may be measured by bend radius or the like, of the hose 10. For the spiral wound layers 30a-b depicted in FIGS. 1 and 2, the constituent yarns or other ends generally will be applied at between about 50-100% coverage, i.e., substantially no space or interstitial area between each successive turn, and under a tension of between about 3-18 lbs (13-80 N).

To better control the elongation and contraction of hose 10, and for improved impulse life, the innermost reinforcement layer 30a may be bonded, either fusion, mechanical, adhesive, or otherwise, to the outer circumferential outer surface 18 of the core tube 14. Preferably such bond will exhibit a strength of between about 2-8 lbs/inch (0.4-1.43 kg/cm), and may be effected by solvating, tackifying, or plasticizing the core tube outer surface 18 with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane or other adhesive having an affinity to the materials forming tube 14 and layer 30a, or otherwise in the manner described, for example, in U.S. Pat. Nos. 3,654,967; 3,682,201; 3,773,089; 3,790,419; 3,861,973; 3,881,975; 3,905,398; 3,914,146; 3,982,982; 3,988,188; 4,007,070; 4,064,913; 4,343,333; 4,898,212; and in Japanese (Kokai) Publ. No. 10-169854 A2, Canadian Patent No. 973,074, and in U.S. 20020100516.

As mentioned, although the illustrative hose construction 10 has been described in an arrangement wherein the two spiral wound reinforcement layers 30 are employed, other arrangements of course may be envisioned. For example, the spiral wound layers 30 may be used in combination with one or more braided and/or knitted layers, which may be formed of fiber or metal wire, depending upon the specific requirements of the particular application involved.

The outermost reinforcement layer, such as layer 30b in the illustrated construction, may, in turn, be sheathed within one or more layers of a coaxially-surrounding protective cover or jacket, referenced at 40, having a circumferential interior surface, 42, and an opposing circumferential exterior surface, 44. Depending upon its construction, cover 40 may be crosshead, co-extruded, or otherwise conventionally extruded, spiral or longitudinally, i.e., "cigarette," wrapped, or braided over the reinforcement layer 30b as, for example, a metal or textile braid or a 0.02-0.15 inch (0.5-3.8 mm) thick layer of rubber or, preferably, an abrasion-resistant thermoplastic, i.e., melt-processible, material. Such material, which may be filled with one or more of fibers, glass, ceramics, or metals, or which may be unfilled, may be a homopolymer, copolymer or blend or other mixture of homopolymers, copolymers, or one or more homopolymers and one or more copolymers. Suitable materials may include polyamides, polyolefins, polyesters, polyvinyl chlorides, and, preferably, TPU's, as well as copolymers and blends or other mixtures or combinations thereof. By "abrasion-resistant," it is meant that such thermoplastic material for forming cover 30 may have a hardness of between about 60-95 Shore A durometer. As mentioned, cover 40 alternatively may be formed of a vulcanizable natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber. In the case of either a thermoplastic or rubber, the layer thereof forming the cover 40 may be reinforced with one or more embedded layers which may be formed of a braided or woven fabric or metal. Additives such as pigments, fillers, lubricants, stabilizers, antioxidants, coloring agents, fire retardants, and the like also may be incorporated into the composition forming the cover 40.

Similar to the bonding of core 14 to the innermost reinforcement layer 30a, the interior surface 42 of cover 40 may be bonded to the outermost reinforcement layer 30b. Such bond, again, may be either fusion, mechanical, adhesive, or other, and preferably will exhibit a strength of at least about 8 lbs/inch (1.43 kg/cm). As before, the bond may be effected by solvating, tackifying, or plasticizing the surface of the outermost reinforcement layer 30b with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane or other adhesive having an affinity to the materials forming reinforcement layer 30b and cover 40, or otherwise in the manner described in the above-cited references or in the manner to be described in connection with the bonding between layers 30a-b.

In the illustrative multi-layer construction of cover 40 shown in FIGS. 1 and 2, cover 40 is provided as having an innermost cover layer, 46, which is formed of a first, preferably, thermoplastic material and which defines the interior cover surface 42, and a surrounding outermost cover layer, 48, which is formed of a second, preferably, thermoplastic material and which defines the exterior cover surface 44. Depending upon the application, the relative thicknesses of the layers 46 and 48 may be different or about the same. However, to further enhance the flexibility of hose 10, the first thermoplastic material forming the innermost cover layer 46 may be selected has having a flexural modulus which is lower than the flexural modulus of the outermost cover layer 48. In this way, the thickness of the less flexible outermost cover layer 48 may be decreased as compared to a single layer construction of cover 40. Although may combinations of materials may be used, the first thermoplastic material forming the more flexible innermost layer 46 may be a polyamide, polyolefin, polyvinyl chloride, silicone, polyurethane, a natural or synthetic rubber, or a copolymer of blend thereof, with the second material being, independently, a less flexible but harder, i.e., at least about 60 Shore A durometer, polyamide, polyurethane, or a copolymer or blend thereof. If formed of chemically compatible thermoplastic materials, the respective layers 44 and 46 may be fusion bonded together at their interface. Alternatively, if formed of chemically incompatible materials, the respective layers 44 and 46 may be bonded together with an adhesive or tie layer (not shown) interposed therebetween.

Figure 3:
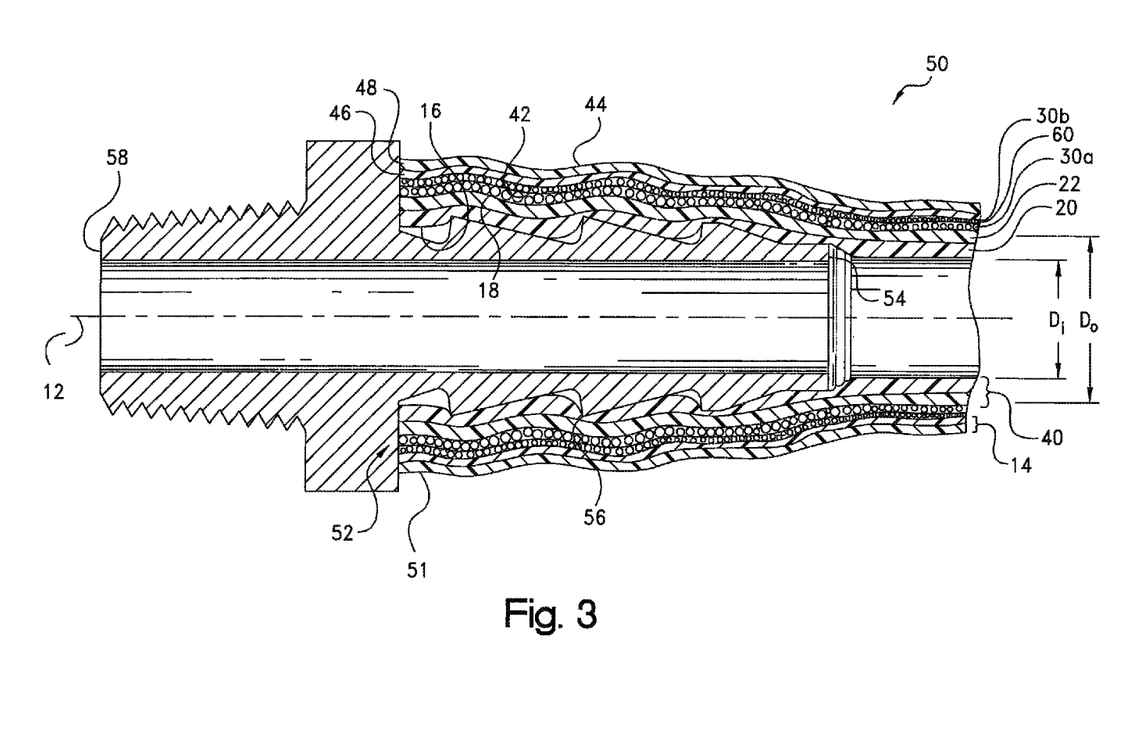
FIG. 3 is a side cross-sectional view showing the connection of the push-on hose of FIG. 1 to the nipple end of a representative push-in fitting.

Referring lastly to FIG. 3, the push-on hose construction 10 of FIGS. 1 and 2 reappears in the illustrative coupling assembly or connection referenced at 50. With the assembly 50, hose 10 is provided as having a terminal end, 51, which is connected with a representative push-in fitting, 52. As may be seen, fitting 52 extends coaxially with hose 10 along a longitudinal axis, commonly referenced at 12 with the hose 10 axis, as having an elongate distal end, 54, which is inserted into the hose end 52, and an opposite end, 58, which may be configured as shown for a threaded pipe or other connection. The inserted fitting end 54 may be configured as shown as a nipple having a series of barbs, one of which is referenced at 56. Depending upon the style of the nipple end 54, one or more of the barbs 56 may define the outer diametric extent, referenced at $d_o$, of the end 54, which extent is sized to be marginally larger, i.e., by between about 5-25%, than the inner diametric extent $D_i$, defined by the inner surface 16 of the hose core tube 14.

With the nipple end 54 being pushed into the hose inner diameter, it may be seen that the core tube 14 recovers from the expansion caused by the insertion of the fitting nipple end 54 to frictionally or otherwise self-grippably retain the fitting in an interference-type joint. Advantageously, the construction of the core tube 14 in accordance with the precepts of the present invention has been obverse to reduce, such as by at least about 10% as compare to a conventional core tube, the push-in force required to insert the fitting end 54, but without appreciably affecting the pull-out or blow-off force required to remove the end. Such reduction in push-in force facilitates the assembly of the connection 50, such as by allowing for the fitting end to be inserted manually without the need for tools.

Thus, an illustrative push-on hose construction is described which allows for easier fitting insertion. Such a construction, which may be entirely thermoplastic or a combination of rubber and plastic, is particularly adapted for a variety of pneumatic, vacuum, shop air, general industrial, maintenance, and automotive applications such as for air, oil, antifreeze, and fuel.

As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:

a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:
- a resin component which is a thermoplastic polyurethane elastomer having a shore durometer of between about 60A and 98A; and
- an incompatibilizing agent immiscible with the resin component, the agent being effective to reduce the force necessary to insert the fitting distal end into the hose terminal end connecting the hose to the fitting, and the agent is selected from the group consisting of homopolymers and copolymers of one or more polyolefins, and combinations thereof.

2. The assembly of claim 1 wherein the resin component is essentially polar and the agent is essentially nonpolar.

3. The assembly of claim 1 wherein the fitting distal end has at least one barb which defines the outer diameter of the fitting distal end.

4. The assembly of claim 1 wherein the hose further comprises one or more reinforcement layers surrounding the core tube.

5. The assembly of claim 4 wherein the one or more reinforcement layers each comprises one or more filaments of one or more fibers.

6. The assembly of claim 5 wherein the one or more reinforcement layers each is braided, wound, woven, or knitted, independently, of the one or more filaments of the one or more fibers.

7. The assembly of claim 6 wherein the one or more fibers is selected from the group consisting of nylon fibers, polyester fibers, aramid fibers, polyvinyl alcohol fibers, polyvinyl acetate fibers, polyolefin fibers, polyphenylene bezobisoxazole fibers, metal wires, and combinations thereof.

8. The assembly of claim 4 wherein the hose further comprises a cover surrounding the one or more reinforcement layers.

9. The assembly of claim 8 wherein the cover is formed of one or more layers of a polymeric material selected, independently, from the group consisting of polyurethanes, polyamides, polyolefins, silicones, polyesters, fluoropolymers, thermoplastic elastomers, polyvinyl chlorides, polyurethanes, natural and synthetic rubbers, and copolymers and combinations thereof.

10. The assembly of claim 1 wherein the agent is selected from the group consisting of homopolymers and copolymers of one or more polybutylenes, polypropylenes, polyethylenes, polystyrenes, ethylene-propylene-diene rubbers, and combinations thereof.

11. The assembly of claim 1 wherein the agent is a copolymer of styrene and butadiene.

12. The assembly of claim 1 wherein the resin component is a thermoplastic.

13. The assembly of claim 1 wherein the innermost layer of the core tube has a wall thickness of between about 0.02-0.08 inch (0.5-2 mm).

14. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:
- a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:
- a resin component; and
- up to about 25%, by total weight of the admixture, of an incompatibilizing agent immiscible with the resin component, the agent being effective to reduce the force necessary to insert the fitting distal end into the hose terminal end connecting the hose to the fitting.

15. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:
- a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:
- a resin component which is a thermoplastic polyurethane elastomer [formed of the reaction product of one or more isocyanate-functional components and one or more hydroxyl-functional components]; and
- an incompatibilizing agent immiscible with the resin component, the agent being effective to reduce the force necessary to insert the fitting distal end into the hose terminal end connecting the hose to the fitting, and the agent is selected from the group consisting of homopolymers and copolymers of one or more polyolefins, and combinations thereof.

16. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:
- a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:
- a resin component; and
- an incompatibilizing agent immiscible with the resin component, the agent being effective to reduce the force necessary to insert the fitting distal end into the hose terminal end connecting the hose to the fitting,
- wherein the core tube interior surface has a coefficient of static friction of between about 0.6-1.0.

17. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:

a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:

a resin component; and an incompatibilizing agent immiscible with the resin component, the agent being effective to reduce the force necessary to insert the fitting distal end into the hose terminal end connecting the hose to the fitting, wherein the core tube interior surface has a coefficient of kinetic friction of between about 0.5-0.8.

18. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:

a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:

a resin component; and an incompatibilizing agent immiscible with the resin component, the agent being effective to reduce the force necessary to insert the fitting distal end into the hose terminal end connecting the hose to the fitting, wherein the coefficient of static friction of the core tube interior surface is reduced by about 500% by the addition of the agent as compared to the core tube innermost layer being formed of the resin component alone.

19. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:

a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:

a resin component; and an incompatibilizing agent immiscible with the resin component, the agent being effective to reduce the force necessary to insert the fitting distal end into the hose terminal end connecting the hose to the fitting, wherein the coefficient of kinetic friction of the core tube interior surface is reduced by about 325% by the addition of the agent as compared to the core tube innermost layer being formed of the resin component alone.

20. An assembly including a flexible push-on hose having a terminal end with an inner diameter, and a push-in fitting having an elongate distal end with an outer diameter marginally larger than the inner diameter of the hose terminal end, the fitting distal end being insertable under a predetermined force into the hose terminal end to connect the hose to the fitting, the hose comprising:

a core tube having at least an innermost layer with an interior surface forming the inner diameter of the hose terminal end, the core tube being radially expandable upon the insertion of the fitting distal end to accommodate the outer diameter thereof, and the core tube being radially recoverable to retain the fitting distal end within the hose terminal end, the core tube innermost layer being formed of material comprising an admixture of:

a resin component; and an incompatibilizing agent immiscible with the resin component, the agent being effective to reduce the force necessary to insert the fitting distal end into the hose terminal end connecting the hose to the fitting, wherein the reduction in the force necessary to insert the fitting distal end into the hose terminal end is at least about 10%.

* * * * *